(No Model.)
H. S. LORD & C. BIRKERY.
WATER CLOSET VALVE.
No. 265,112. Patented Sept. 26, 1882.
fig. 1
fig. 3
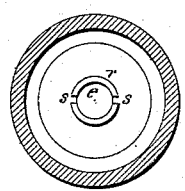
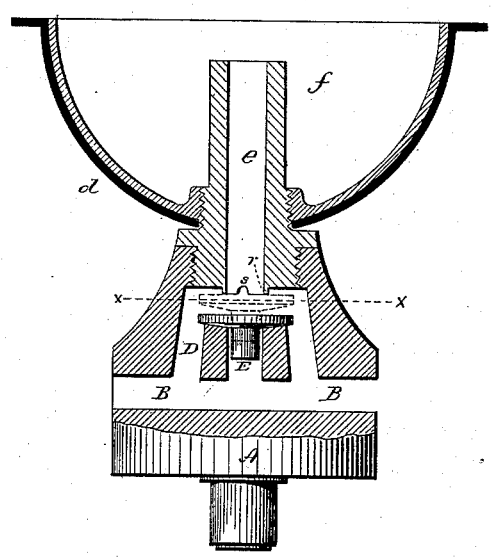
fig. 2
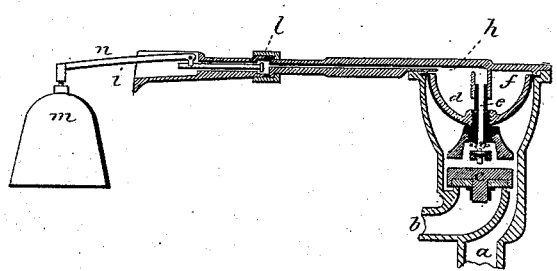
Witnesses: Henry S. Lord & Cornelius Birkery, Inventors.
By Atty.

UNITED STATES PATENT OFFICE.

HENRY S. LORD AND CORNELIUS BIRKERY, OF HARTFORD, CONNECTICUT, ASSIGNORS TO THE HARTFORD SANITARY PLUMBING COMPANY, OF SAME PLACE.

WATER-CLOSET VALVE.

SPECIFICATION forming part of Letters Patent No. 265,112, dated September 26, 1882.

Application filed July 12, 1882. (No model.)

*To all whom it may concern:*

Be it known that we, HENRY S. LORD and CORNELIUS BIRKERY, of Hartford, in the county of Hartford and State of Connecticut, have invented a new Improvement in Water-Closet Valves; and we do hereby declare the following, when taken in connection with accompanying drawings and the letters of reference marked thereon, to be a full, clear, and exact description of the same, and which said drawings constitute part of this specification, and represent, in—

Figure 1, a vertical central section enlarged; Fig. 2, a section on line $x\,x$, looking up; Fig. 3, a horizontal section, showing the adaptation of the valve to the Hartford Sanitary Plumbing Company's closet.

This invention relates to an improvement in the valve for admitting or cutting off the supply of water to the bowl of a water-closet, and particularly to the valve employed in the closet of the well-known Hartford Sanitary Plumbing Co., and such as shown in Fig. 3, in which $a$ is the inlet or water-supply passage, $b$ the passage to the bowl. $c$ is the valve arranged to close the passage $b$ and cut off the flow of water thereto. The valve is hung to a flexible diaphragm, $d$, and through the valve is a small passage, $e$, through which water may flow from the main passage $a$ until a pressure above the valve is established equal to the pressure from below. From the chamber $f$, above the diaphragm, a passage, $h$, leads to the waste $i$, and in this passage is a valve, $l$, which is closed by means of a float, $m$, hung upon a lever, $n$, the float hanging in a chamber adjacent to the bowl, so that when the water in the bowl has reached a certain elevation the float will be raised and turn the lever $n$ so as to close the valve $l$; but when the water is permitted to escape from the bowl, then the float $m$ falls and opens the valve $l$, and consequently the passage from the chamber $f$ above the diaphragm $d$. Supposing the valve $c$ to be in its closed position, the valve $l$ also closed, then when the water is permitted to escape from the bowl the float will fall and open the valve $l$, relieving the valve $c$ from the balancing-pressure above. Immediately the pressure from the passage $a$ upon the under side of the valve $c$ causes it to rise, as seen in broken lines Fig. 3, and the water to flow through the passage $b$ to the bowl. The small opening into the chamber $f$ is no greater than the escape-passage from the chamber $f$. Hence the water, which will naturally flow into the chamber $f$, will escape therefrom and the valve $c$ be held open and the flow continue to the bowl until the water in the bowl shall rise to the predetermined point, which will act upon the float $m$. Then the float will rise and close the valve $l$ so as to prevent the flow of water from the chamber $f$. Then the water will continue to flow through the passage $a$ and into the chamber $f$ until the pressure in the chamber above the diaphragm produces an equilibrium, which will cause the valve $c$ to fall upon its seat and close the passage to the bowl. The pressure of the water is then upon the top of the valve. This construction of valve is too well-known to require more detailed description, and is substantially the construction of valve and escape of the water to produce equilibrium as used in various closets. A serious difficulty arises in the use of these valves owing to the necessarily small aperture through which the water escapes to produce the equilibrium upon the valve, these small openings being liable to be choked or stopped by foreign substances in the water, and when so stopped require a plumber to clear them. Another difficulty existing in the use of this class of valves is the "hammering" in the pipes. If the chamber directly above the valve be filled too quickly—that is, under high pressure—it throws the valve back onto its seat, causing the inflow to instantly stop, and produces what is called "hammering" in all the connecting pipes.

The object of this invention is to overcome these difficulties; and it consists in the arrangement of a valve in the escape-passage which will, when the pressure of water is admitted, nearly close that passage, leaving only the required escape, but when at rest will entirely open the passage, so that a considerable flow of water will pass around and upon the valve to clear the passages should foreign substances enter therein, and as more fully hereinafter described.

In order to better illustrate the invention, we show the valve enlarged to twice the full size in Fig. 1, in which A represents the valve c of Fig. 3. A passage, or several openings, B, are made through the valve above its face, entering into the chamber D, into which chamber the escape-passage e opens into the chamber f above the diaphragm d. In the chamber D is a valve, E, which rests below the lower end of the passage e, and distant therefrom, so as to leave clear connection from the chamber D to the passage e. Around the lower end of the passage e is a downwardly-projecting flange, r, (see Fig. 3,) and in this flange notches s, more or less in number, are made. When the water is admitted, as before described, it flows above the valve A through the passages B, and beneath the valve E, causing that valve to rise and stand against the flange r, around the passage, as seen in broken lines, Fig. 1. This closes that passage, except as to the one or more notches s, and so that the only escape of water through the passage e is through the notch or notches s. These correspond in area to the required escape to produce the equilibrium at the desired time—that is, when the bowl shall have become filled, as before described. So soon as the equilibrium has been established the valve E will fall upon its rest and there stand, it being entirely surrounded by water, and in so falling opens the passage e and leaves the notches s free, so that the next flow of water will necessarily wash those notches and their surroundings before the valve E can be raised to contract that passage to the notches s. The valve E, when it rises and strikes the lower end of the passage e, will tend to start from that part of the water-way any obstructions which may have lodged therein. By this construction we are enabled to contract the escape to the smallest possible extent without danger of that small escape becoming clogged.

By the employment of the valve E, in connection with the free open passage e, the "hammering" is avoided, because the first inflow of water is forced freely through the passage e, not interrupted by the usual small apertures, and this flow continues until the valve E rises to reduce the passage e. The closing of the valve E must be gradual, because it is produced simply by the momentum of the water; hence the first shock which produces the hammering effect before described is avoided, because the valve E, in connection with the passage e, serves as a "cushion" to resist the reaction of the sudden inflow of water.

As before stated, while designed with special reference to the Hartford Sanitary Plumbing Company's closet, this valve may be employed in connection with many of the closets which close the inflow of water by an equilibrium produced upon the valve.

While we prefer to make the notches s in the lower end of or flange surrounding the passage e, they may be made in the face of the valve, it only being essential that the valve shall be so arranged as to partially close the passage e when the water is admitted and open that passage when the water is cut off.

We claim—

1. The combination of the valve by which the flow to the bowl is opened and closed, an escape-passage from above the valve, a valve arranged to operate in connection with said escape-passage to partially close the said passage when the flow of water is admitted and open said passage when the flow is cut off, substantially as described.

2. The valve A, constructed with water-passages B, into a chamber, D, the escape-passage e, opening into said chamber D, the valve E, arranged in said chamber and below the passage e, the said valve arranged to partially close the said passage e when the water is admitted and open said passage when the flow is cut off, substantially as described.

HENRY S. LORD.
CORNELIUS BIRKERY.

Witnesses:
ROBT. E. DAY,
W. L. MATSON.